(12) United States Patent
Lovitt

(10) Patent No.: US 9,659,562 B2
(45) Date of Patent: May 23, 2017

(54) ENVIRONMENT ADJUSTED SPEAKER IDENTIFICATION

(71) Applicant: MICROSOFT TECHNOLOGY LICENSING, LLC, Redmond, WA (US)

(72) Inventor: Andrew William Lovitt, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/251,917

(22) Filed: Aug. 30, 2016

(65) Prior Publication Data

US 2016/0372120 A1    Dec. 22, 2016

Related U.S. Application Data

(63) Continuation of application No. 14/602,166, filed on Jan. 21, 2015, now Pat. No. 9,437,193.

(51) Int. Cl.
| | | |
|---|---|---|
| *G10L 17/00* | (2013.01) | |
| *G10L 17/20* | (2013.01) | |
| *G10L 17/04* | (2013.01) | |
| *G01H 7/00* | (2006.01) | |
| *G10L 17/06* | (2013.01) | |
| *G10L 21/0208* | (2013.01) | |
| *G10L 15/30* | (2013.01) | |

(52) U.S. Cl.
CPC ............ *G10L 17/20* (2013.01); *G01H 7/00* (2013.01); *G10L 17/04* (2013.01); *G10L 17/06* (2013.01); *G10L 21/0208* (2013.01); *G10L 15/30* (2013.01)

(58) Field of Classification Search
CPC ............... G06F 3/016; G06F 3/03543; G06F 2203/014; H04L 69/329; A63F 2300/1037
USPC .......................................................... 704/243
See application file for complete search history.

(56) References Cited

U.S. PATENT DOCUMENTS

| | | |
|---|---|---|
| 6,233,556 B1 | 5/2001 | Teunen et al. |
| 6,804,647 B1 | 10/2004 | Heck et al. |
| 9,437,193 B2 * | 9/2016 | Lovitt ................... G10L 17/04 |

FOREIGN PATENT DOCUMENTS

EP        1843525        10/2007

OTHER PUBLICATIONS

International Preliminary Report on Patentability issued in PCT application No. PCT/US2016/012304 mailed Mar. 8, 2017.

* cited by examiner

*Primary Examiner* — Charlotte M Baker
(74) *Attorney, Agent, or Firm* — Workman Nydegger

(57) ABSTRACT

A system estimates environment-specific alterations of a user sound received at the system. The system modifies the received user sound to formulate a modified user sound by at least compensating for the audio modifications and/or formulates an expected audio model of a user by modifying a stored user-dependent audio model of the user with the audio modification. The system is also capable of estimating whether the received user sounds is from a particular user by use of a corresponding user-dependent audio model.

20 Claims, 3 Drawing Sheets

ENVIRONMENT ADJUSTED SPEAKER IDENTIFICATION

CROSS-REFERENCE TO RELATED APPLICATIONS

This application is a continuation of U.S. patent application Ser. No. 14/602,166 filed on Jan. 21, 2015, entitled "ENVIRONMENT ADJUSTED SPEAKER IDENTIFICATION," which issued as U.S. Pat. No. 9,437,193 on Sep. 6, 2016, and which application is expressly incorporated herein by reference in its entirety.

BACKGROUND

Computing systems and associated networks have revolutionized the way human beings work, play, and communicate. Computing systems have now become quite prolific, and have taken a variety of different forms, such as desktops, laptops, smartphones, wearables, and the like. Computing systems may also be distributed throughout the globe.

One helpful advance in computing systems is that such systems are more capable of receiving voice commands from a user. Furthermore, systems are now able to authenticate a user based on his or her voice. In order for the speaker identification to work, conventionally a user will train a system by speaking certain phrases to the system. The system will evaluate those spoken phrases to determine user-specific unique characteristics of the voice. Those unique user-specific characteristics may then be used to evaluate future voice input from that same user so that the system can identify that user.

Training can take time, and typically the user must train each system that identifies based on voice input. Furthermore, the training process may be different for each system. Accordingly, it may take considerable user time investment to train each system to recognize a given user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to computerized estimation of an identity of a user of a computing system. The system estimates environment-specific alterations of a received user sound that is received at the computing system. For instance, the system might expect certain acoustic echoes or filtering that is a result of the room or environment in which the computing system is placed, or that is the result of a predicted positional relationship between the user and the computing system.

The system estimates whether the received user sounds is from a particular user by use of a corresponding user-dependent audio model. The user-dependent audio model may be stored in a multi-system store accessible such that the method may be performed for a given user across multiple systems and on a system that the user has never before trained to recognize the user. This is accomplished despite each system experiencing perhaps different environmental adjustments (e.g., echoes, filtering, absorption, reflections, impulse response, and so forth) in the received user sound. This reduces or even eliminates the need for a user to train a system to recognize the voice of a user, and allows multiple systems to take advantage of previous training performed by the user.

For instance, in one aspect described herein, the system facilitates a formulation of an expected audio model of a user's sound when the corresponding user-dependent audio model is subject to the estimated environment-specific alterations. The system then obtains a comparison result of comparing the received user sound with the formulation of the expected audio model. The system then estimates whether the user corresponding to the user-dependent audio model is the same as the user that emitted the user sound based on the comparison result.

In accordance with another aspect described herein, the system causes the received user sound to at least be partially compensated for by the estimated environment-specific alterations. The system then obtains a comparison result of comparing the manipulated received user sound with the corresponding user-dependent audio model of a user. The system then estimates whether the user corresponding to the user-dependent audio model is the same as the user that emitted the user sound based on the comparison result.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
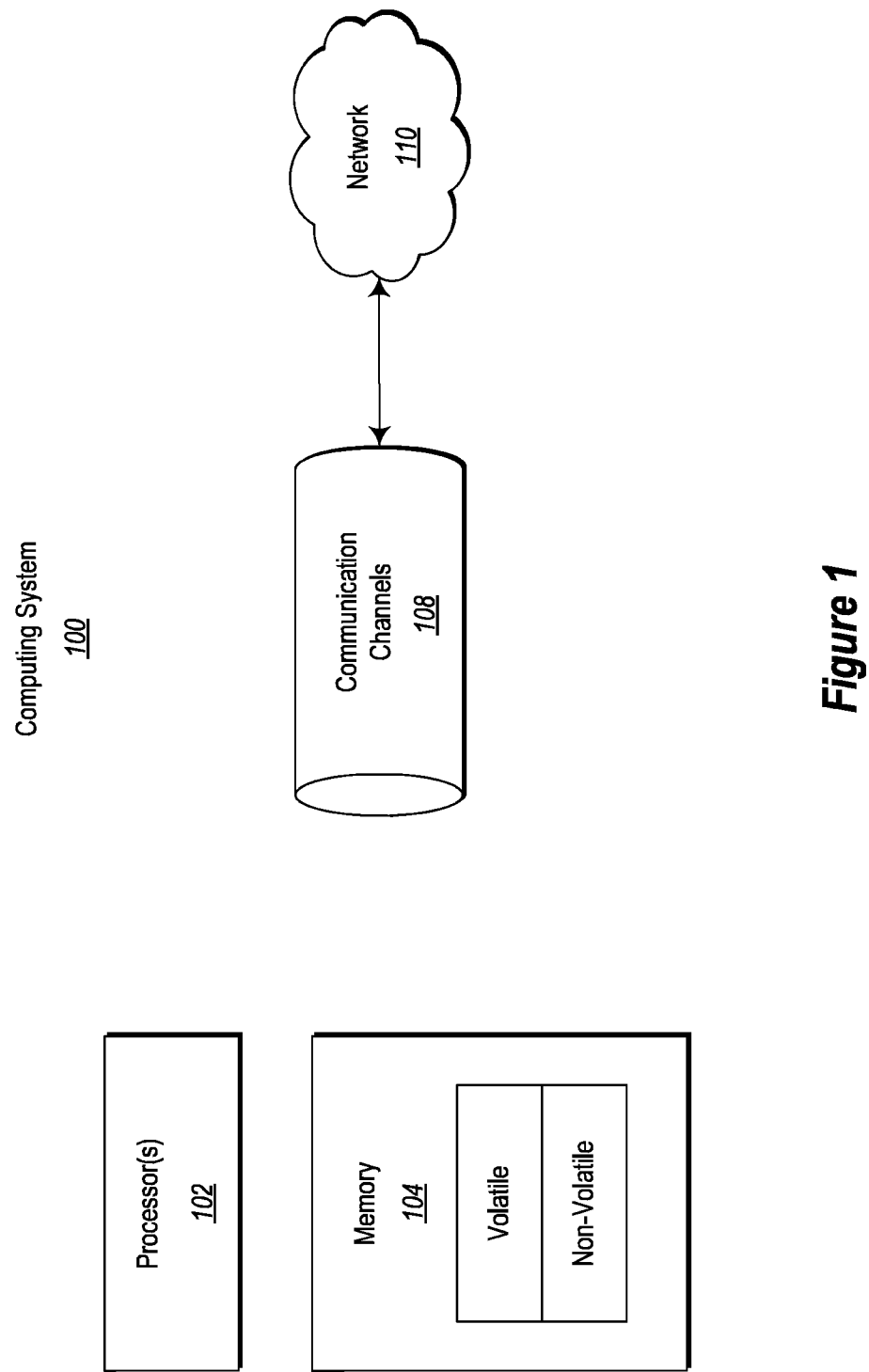
FIG. 1 abstractly illustrates a computing system in which some embodiments described herein may be employed.

At least some embodiments described herein relate to computerized estimation of an identity of a user of a computing system. The system estimates environment-specific alterations of a received user sound that is received at the computing system. For instance, the system might expect certain acoustic echoes or filtering that is a result of the room or environment in which the computing system is placed, or that is the result of a predicted positional relationship between the user and the computing system.

The system estimates whether the received user sounds is from a particular user by use of a corresponding user-dependent audio model. The user-dependent audio model may be stored in a multi-system store accessible such that the method may be performed for a given user across multiple systems and on a system that the user has never before trained to recognize the user. This is accomplished despite each system experiencing perhaps different environmental adjustments (e.g., echoes, filtering, absorptions, reflections, impulse response, and so forth) in the received user sound. This reduces or even eliminates the need for a user to train a system to recognize the voice of a user, and allows multiple systems to take advantage of previous training performed by the user.

For instance, in one aspect described herein, the system facilitates a formulation of an expected audio model of a user's sound when the corresponding user-dependent audio model is subject to the estimated environment-specific alterations. The system then obtains a comparison result of comparing the received user sound with the formulation of the expected audio model. The system then estimates whether the user corresponding to the user-dependent audio model is the same as the user that emitted the user sound based on the comparison result.

In accordance with another aspect described herein, the system causes the received user sound to at least be partially compensated for by the estimated environment-specific alterations. The system then obtains a comparison result of comparing the manipulated received user sound with the corresponding user-dependent audio model of a user. The system then estimates whether the user corresponding to the user-dependent audio model is the same as the user that emitted the user sound based on the comparison result.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, clothes, ring, necklace, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. In addition, application-specific integrated circuits (ASICs) may also be used to perform some or all of the functions described herein. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
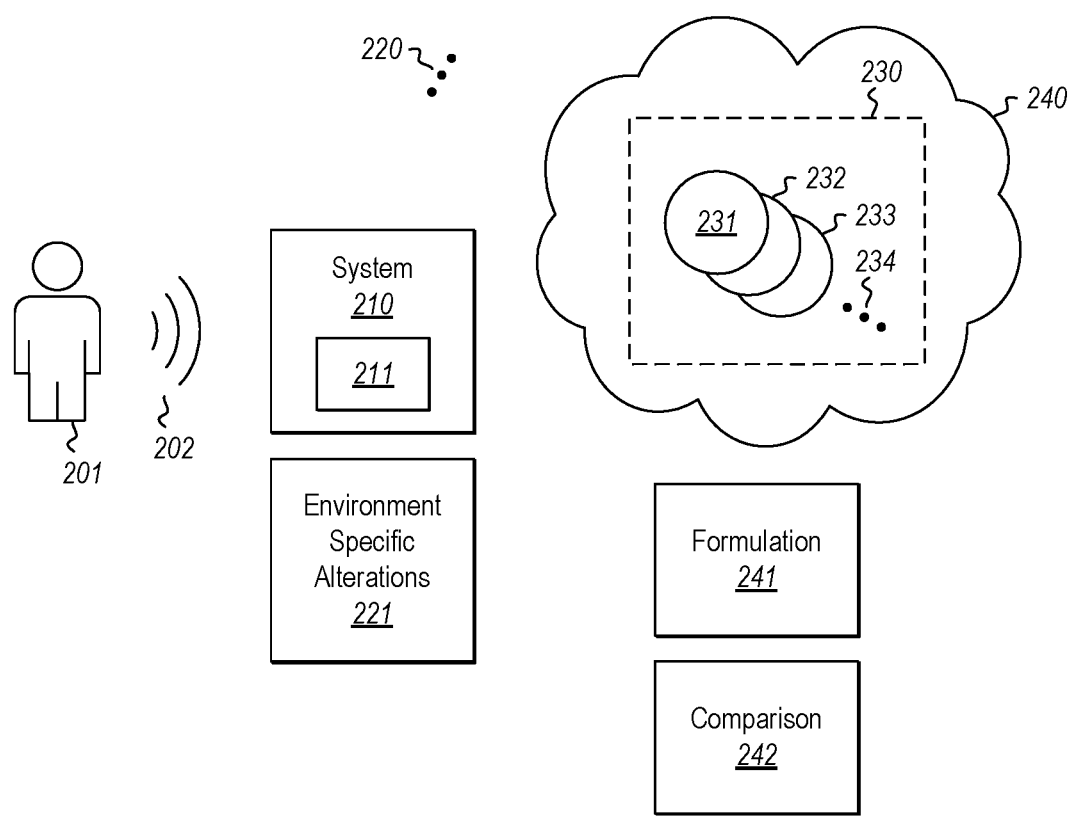
FIG. 2 illustrates an environment in which a user issues a user sound to a computing system that uses a library of user-dependent audio models to estimate an identity of the user.

FIG. 2 illustrates an environment 200 in which a user 201 issues a user sound 202 to a computing system 210. The computing system 210 then uses an estimation module 211 to estimate whether or not the user 201 is a particular user. As an example, the computing system 210 may be structured as described above for the computing system 100 of FIG. 1. In a typical example, the user sound might be the voice of a user. However, the user sound might alternatively be a clapping sound, or a whistling sound. The sound may perhaps be made with the assistance of a unique device that the user has access to—such as a user-selected whistle, musical instrument, or synthesizer. The user might have unique capabilities to use a device to make a sound unique to the user. For instance, the user may possess an alto saxophone having a particular tone and play a certain complex sequence to identify the user.

The estimation module 211 estimates environment-specific alterations 221 associated with an environment in which the computing system is placed, and that represents alterations that could occur between a time that the user sounds originated from user, and the time that the user sound was received by the computing system. Such might be dependent upon relative position between the user 201 and the computing system 210, and perhaps on echoes and filtering contributed by the environment in which the user 201 and the computing system 210 are present.

These environment-specific alterations 221 may have been previously estimated based on historic data regarding interaction of a different user, or a wide variety of users, with the computing system. Alternatively or in addition, the environment-specific alterations 221 may also be based on what the computing system 210 has learned about its environment, and an estimated reverberation response between the user and the microphone that picked up the user sound. For instance, the computing system 221 might be able to measure the dimensions of a room in which the computing system is placed, and measure acoustic reflectivity of various surfaces in the room. For instance, the computing system 210 might use infrared, 3-D vision, or other depth sensing techniques to learn about its environment. Alternatively or in addition, the environment-specific alterations could also be based on the microphone response that received the user sound. Alternatively or in addition, the estimation may factor in estimated dynamic change in the usage of the computing system. For instance, there may be some expected variance in the environment-specific alterations. For example, the device might be a telephone in which case the received voice signal might be with the user having his mouth close to the mouthpiece, or some feet away (as might be the case when in speakerphone setting).

In order to estimate whether the user 201 is a particular user, the computing system 210 may also at least indirectly use a user-dependent audio model of a candidate user. For instance, the environment 200 includes an audio model library 230 in which a number of user-dependent audio models are placed. For instance, the library 230 is illustrated as including three user-dependent audio models 231, 232 and 233. However, the ellipses 234 represents that there may be any number of user-dependent audio models within the library 230, even thousands, millions, or even billions. The user-dependent audio model may include an expected sound when the user repeats a certain phrase in an acoustically clean environment in which the environment itself contributes no reverberation, echo, or other acoustic degradation.

The library 230 is kept in a multi-system store 240 that may be accessed by the computing system 210 as well as at least one other, and potentially many other, computing systems as represented by ellipses 220. As an example, the multi-system store 240 might be a storage area network, a server system, a multi-server system, or even a cloud computing environment (such as a private cloud, a public cloud, or a hybrid cloud).

In any case, the computing system 210 estimates an identity of a user of the computing system using the estimated environment-specific alterations 221, and also at least indirectly using associated one or more user-dependent audio models that are stored in the multi-system store 240. This description will describe two primary embodiments for how this might be accomplished—one described with respect to FIG. 3, and one with respect to FIG. 4. Both embodiments perform a comparison of the received user sound with a user-specific audio model after compensating for environment-specific alterations. However, in the case of FIG. 3, the user-specific audio model is compensated for by the environment-specific alterations prior to making the comparison. In the case of FIG. 4, the received user sound is compensated for by the environment-specific alterations prior to making the comparison. The environment-specific alterations could be applied when the model is stored. For instance, the user-specific audio model could be downloaded to a specific computing system environment. The environment-specific alterations could then be applied and saved to the computing system. This saves runtime cost for future comparisons by the computing system in that specific environment.

In order to assist the estimation module 211 in making the estimation of whether the user 201 is a particular user 201, a formulation module 241 and a comparison module 242 are also provided. The operation of the formulation module 241 and the comparison module 242 will be described further below. The formulation module 241 may be part of the computing system 210. Alternatively, the formulation module 241 may be remote from the computing system 210 or otherwise operate external to the computing system (e.g., in a cloud computing environment). The formulation module 241 might also be distributed between the computing system 210 and one or more external computing systems. The comparison module 242 may also be part of the computing system 210. Alternatively, the comparison module 242 may be remote from the computing system 210 or otherwise operate external to the computing system (e.g., in a cloud computing environment). The comparison module 242 might also be distributed between the computing system 210 and one or more external computing systems.

Figure 3:
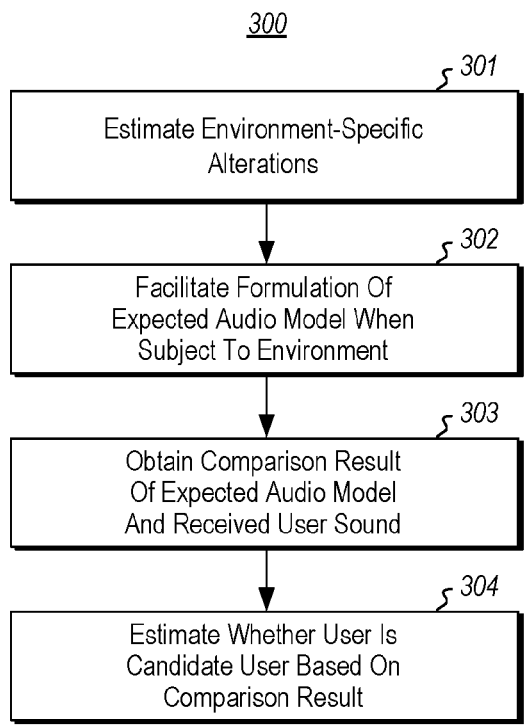
FIG. 3 illustrates a flowchart of a method for estimating an identity of a user of a computing system in accordance with a first embodiment described herein in which the user-dependent audio model is adjusted to account for environment-specific alterations.
Figure 4:
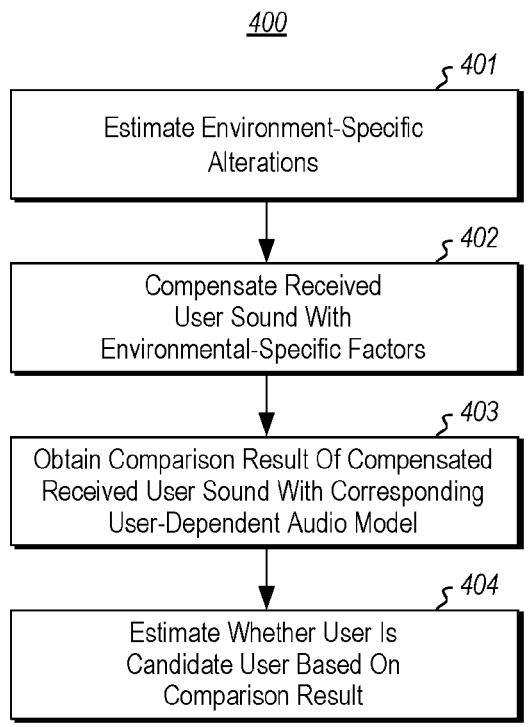
FIG. 4 illustrates a flowchart of a method for estimating an identity of a user of a computing system in accordance with a second embodiment described herein in which the received user sound is adjusted to account for environment-specific alterations.

FIG. 3 illustrates a flowchart of a method 300 for estimating an identity of a user of a computing system in accordance with a first embodiment described herein. The method 300 of FIG. 3 may be performed by the estimation module 211 in the environment 200 of FIG. 2. Accordingly, the method 300 of FIG. 3 will now be described with frequent reference to the environment 200 of FIG. 2.

The environment-specific alterations associated with the environment are estimated (act 301). As previously described, these environment-specific alterations 221 may have been previously estimated based on historic data regarding interaction of the computing system with a different user or a wide variety of users, may be based on what the computing system 210 has learned about its environment through various sensors, and/or may be based on the microphone response that received the user sound. For instance, these environment-specific alterations might be represented as a frequency response.

In accordance with the first aspect described herein, the estimation module 211 then facilitates formulation of an expected audio model of a user's sound when a corresponding user-dependent audio model is subject to the estimated environment-specific alterations (act 302). For instance, the computing system 210 might itself access a user-dependent audio model corresponding to a candidate user from the library 230. The computing system 210 might then convolute the user-dependent audio model with the estimated environment-specific alterations (or apply any mathematical and/or logical operation to the model and alterations) to obtain an expected audio model that is specific to the environment and to the candidate user. Furthermore, a single computing system may optionally have access to multiple possible environment-specific alterations that it might select to apply in this case. For instance, the computing system might select a different alteration based on the position of the user, congestion of the room with other users, humidity, detected obstacles, or any other factor that could affect the environment-specific alterations.

Alternatively, the computing system 210 might delegate the formulation of this expected audio model to the formulation module 241. In that case, the computing system 210 would provide or identify the estimated environment-specific alterations 221 to the formulation module 241, so that the formulation module 241 can then perform the convolution to formulate the expected audio model for the candidate user in the environment.

The estimation module 211 of the computing system 210 then obtains a comparison result of comparing the received user sound with the formulation of the expected audio model (act 303). For instance, the computing system 210 itself may perform the comparison of the received user sound with the formation of the expected audio model. To do that, the computing system 210 would have access to the formulation of the expected audio model. If the formulation of the expected audio model was performed by the computing system 210, this would not involve significant data transfer. If the formulation of the expected audio model was performed by the formulation module 241, then the computing system 210 would retrieve the formulated expected audio model from the formulation module 241.

On the other hand, the comparison may be performed by a comparison module 242. In that case, the computing system 210 may provide the received user sound to the comparison module 242 as one point of comparison. As the second point of comparison, the comparison module 242 also obtains the formulation of the expected audio model (either from the computing system 210 if the formulation was performed by the computing system 210, or from the formulation module 241 if the formulation was performed by the formulation module 241). The estimation module 211 then obtains the comparison results from the comparison module 242. For instance, in one embodiment, the estimation module 211 may simply receive a comparison ranking.

The estimation module 211 then estimates whether the user corresponding to the user-dependent audio model is the same as the user that emitted the user sound based on the comparison result (act 304). As an example, this might be simply determining whether a comparison ranking is above a predetermined threshold. In some embodiments, the predetermined threshold may be adjusted upwards or downwards to thereby adjust a tolerance of the comparison to be stricter or more lenient. For instance, if the environment is secure such that proper identification of the user is an imperative, then the predetermined threshold may be adjusted upwards since a false positive determination is much more harmful in that circumstance that a false negative determination. On the other hand, if proper identification is more of a convenience, then the predetermined threshold may be adjusted downwards to thereby allow some false positives.

The method 300 may repeat for multiple potential candidate users, until an acceptable or best match is found. Furthermore, the method 300 may be performed by the computing system 210 with respect to different users.

FIG. 4 illustrates a flowchart of a method 400 for estimating an identity of a user of a computing system in accordance with a second aspect described herein. Again, the method 400 is initiated by estimating environment-specific alterations of a received user sound that is received at the computing system (act 401). For instance, the act 401 may be accomplished substantially as described above for the act 301.

The estimation module 211 then causes the received user sound to be at least partially compensated for by the estimated environment-specific alterations (act 402). For instance, the estimation module 211 might convolute the received user sound with the estimated environment-specific alterations, to thereby obtain an estimate of what the received user sound sounded like when first emitted from the user.

The estimation module 241 then obtains a comparison result of comparing the manipulated received user sound with a user-dependent audio model of a user (act 403). For instance, in FIG. 2, the comparison module 242 (or the computing system 210 itself) might obtain a user-dependent audio module corresponding to a candidate user from the library 230, and compare with the manipulated received user sound. Again the result might be a comparison ranking.

The estimation module then estimates whether the user corresponding to the user-dependent audio model is the same as the user that emitted the user sound based on the comparison result (act 404). Again, this might be performed by comparing the comparison ranking with a predetermined threshold. Once again, the method 400 may be repeated for multiple candidate users for a single received user sound, or may be repeated to thereby identify different users of the computing system.

Accordingly, the principles described herein allow for significant portability in the user training a system to recognize their voice to perform speaker identification. Training performed on one system may be transferred to another system without the user necessarily having to learn a different way of training the new system, and without investing the time training. In some circumstances, the user-specific audio model may be described based on existing history, such as teleconferences, in which the relative position between the user and the microphone is known. As time goes by, the user-dependent audio model may be refined as additional sample voices of the user are received and evaluated in various locations. Furthermore, every time, should the voice of the user change, the mechanical is more likely to pick up on slow voice changes and adjust the user-dependent audio model accordingly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by one or more hardware processors of a continuing system, for improving voice identification by modifying a sound file based on environmental conditions where the computing system is located, the method comprising:
    using one or more sensors of the computing system to identify environmental conditions that affect acoustic properties in an environment where the computing system is located;
    identifying audio modifications that are associated with the acoustic properties that affect sound generated in the environment and that is received at the computing system, wherein the one more hardware processors identify at least one of the audio modifications by generating an estimation regarding how the sound changes between a time when the sound is generated and a time when the sound is received by the one or more sensors;
    using the one or more sensors to receive a user sound that is caused by a particular user and that is affected by the environmental conditions before being received at the computing system; and
    formulating an expected audio model of a user by modifying a stored user-dependent audio model with the audio modifications.

2. The method of claim 1, wherein the method further includes:
    comparing the received user sound with the expected audio model to obtain a comparison result; and
    estimating whether the user corresponding to the stored user-dependent audio model is the same as a particular user that caused the user sound based on the comparison result.

3. The method of claim 1, wherein identifying the environmental conditions includes:
    identifying dimensions of a room in which the computing system is located.

4. The method of claim 3, wherein the identifying includes measuring the dimensions by the computing system with infrared sensors.

5. The method of claim 3, wherein the identifying includes measuring the dimensions by the computing system with depth sensors.

6. The method of claim 3, wherein the identifying includes measuring the dimensions by the computing system with 3-D sensors.

7. The method of claim 3, wherein the identifying includes measuring acoustic reflectivity of surfaces within the room.

8. The method of claim 3, wherein the identifying includes identifying a reverberation associated with the room.

9. The method of claim 3, wherein the identifying is based on historical data measured from sound generated by a plurality of users within the room.

10. The method of claim 3, wherein the identifying includes identifying an echo property associated with the room.

11. The method of claim 3, wherein the identifying is performed by at least inferring a location of the user relative to the computing system based on a computing component of the computing system being used by the user.

12. The method of claim 1, wherein the user sound is a whistle of the particular user.

13. The method of claim 1, wherein the user sound is generated by an instrument played by the particular user.

14. The method of claim 1, wherein the user sound is a voice of the particular user.

15. A method, implemented by one or more hardware processors of a computing system, for improving voice identification by modifying sound based on environmental conditions where the computing system is located, the method comprising:
    using one or more sensors of the computing system to identify environmental conditions that affect acoustic properties in an environment where the computing system is located;
    identifying audio modifications that are associated with the acoustic properties that affect sound generated in the environment and that is received at the computing system, wherein the one or more hardware processors identify at least one of the audio modifications by generating an estimation regarding how the sound changes between a time when the sound is generated and a time when the sound is received by the one or more sensors;
    using the one or more sensors to receive a user sound that is caused by a particular user and that is affected by the environmental conditions before being received at the computing system; and
    modifying the received user sound to formulate a modified user sound by at least compensating for the audio modifications.

16. The method of claim 15, wherein identifying the environmental conditions includes:
    identifying dimensions of a room in which the computing system is located with one or more sensors of the computing system.

17. The method of claim 16, wherein the identifying includes measuring acoustic reflectivity of surfaces, echo and reverberation within the room.

18. The method of claim 15, wherein the identifying is based on historical data measured from sound generated by a plurality of users within the room.

19. The method of claim 15, wherein the method further includes:
  comparing the modified user sound with a stored user-dependent audio model to obtain a comparison result; and
  estimating whether the user corresponding to the stored user-dependent audio model is the same as a particular user that caused the user sound based on the comparison result.

20. One or more hardware storage devices having stored thereon computer-executable instructions that are executable by one or more processors of a computing system, to cause the computing system to perform a method for improving voice identification by modifying sound based on environmental conditions, the method comprising:
  using one or more sensors of the computing system to identify environmental conditions that affect acoustic properties in an environment where the computing system is located;
  identifying audio modifications that are associated with the acoustic properties that affect sound generated in the environment and that is received by the one or more sensors of the computing system, where the one or more processors identify at least one of the audio modifications by generating an estimation regarding how the sound changes between a time when the sound is generated and a time when the sound is received by the one or more sensors;
  using the one or more sensors to receive a user sound that is caused by a particular user and that is affected by the environmental conditions before being received at the computing system;
  at least one of (1) modifying the received user sound to formulate a modified user sound by at least compensating for the audio modifications or (2) formulating an expected audio model of a user by modifying a stored user-dependent audio model of the user with the audio modifications; and
  estimating whether the user associated with the user-dependent audio model is the same as the particular user that generated the user sound based on a comparison of at least (a) the user sound with the expected audio model or (b) the stored user-dependent audio model with the modified user sound.

* * * * *